United States Patent
Ishikawa et al.

(10) Patent No.: US 8,326,521 B2
(45) Date of Patent: Dec. 4, 2012

(54) TRAFFIC SITUATION DETERMINATION SYSTEMS, METHODS, AND PROGRAMS

(75) Inventors: Hiroki Ishikawa, Anjo (JP); Yukio Yamamoto, Anjo (JP); Toshihiro Kano, Nagakute (JP)

(73) Assignee: Aisin AW Co., Ltd., Anjo (JP)

( * ) Notice: Subject to any disclaimer, the term of this patent is extended or adjusted under 35 U.S.C. 154(b) by 1227 days.

(21) Appl. No.: 12/149,081

(22) Filed: Apr. 25, 2008

(65) Prior Publication Data

US 2008/0270015 A1    Oct. 30, 2008

(30) Foreign Application Priority Data

Apr. 26, 2007    (JP) ................................. 2007-117162

(51) Int. Cl.
  *G06G 7/76* (2006.01)
(52) U.S. Cl. ....................................................... 701/119
(58) Field of Classification Search .................. 701/119, 701/117, 118, 412, 468, 469, 471, 472; 340/901, 340/988, 989, 539.13; 455/426.1, 427, 440, 455/441, 152.1
See application file for complete search history.

(56) References Cited

U.S. PATENT DOCUMENTS

| | | | | |
|---|---|---|---|---|
| 5,828,737 | A | * | 10/1998 | Sawyer ..................... 379/114.07 |
| 6,092,020 | A | * | 7/2000 | Fastenrath et al. ............ 701/119 |
| 7,739,029 | B2 | * | 6/2010 | Ishikawa et al. .............. 701/117 |
| 2001/0029425 | A1 | * | 10/2001 | Myr ............................... 701/200 |
| 2007/0038360 | A1 | * | 2/2007 | Sakhpara ...................... 701/117 |
| 2008/0183376 | A1 | * | 7/2008 | Knockeart et al. ............ 701/119 |

FOREIGN PATENT DOCUMENTS

| | | |
|---|---|---|
| JP | A 2004-234649 | 8/2004 |
| JP | A-2004-287804 | 10/2004 |
| WO | WO 96/07110 | 3/1996 |
| WO | WO 2006/086398 A2 | 8/2006 |

OTHER PUBLICATIONS

Oct. 27, 2009 European Search Report issued in Application No. EP 08008044.

* cited by examiner

*Primary Examiner* — Mark Beauchaine
(74) *Attorney, Agent, or Firm* — Oliff & Berridge, PLC (57) ABSTRACT

Traffic situation determination systems, methods, and programs acquire a current position of the vehicle based on a radio signal received from a GPS satellite and determine a first travel path of the vehicle based on the acquired position of the vehicle. The systems, methods, and programs determine whether a road on which the vehicle is traveling has a traffic jam. If the road on which the vehicle is traveling has a traffic jam, the systems, methods and programs transmit first information relating to the first travel path from the vehicle to an information center. The systems, methods, and programs receive second information relating to a second travel path of the vehicle, the second information being received from a mobile phone communication center and being based on a mobile phone signal received by the mobile phone communication center. The systems, methods, and programs determine a road corresponding to the first travel path as having a traffic jam and determine a road corresponding to the second travel path, and not corresponding to the first travel path, as having no traffic jam.

17 Claims, 6 Drawing Sheets

TRAFFIC SITUATION DETERMINATION SYSTEMS, METHODS, AND PROGRAMS

INCORPORATION BY REFERENCE

The disclosure of Japanese Patent Application No. 2007-117162, filed on Apr. 26, 2007, including the specification, drawings and abstract is incorporated herein by reference in its entirety.

BACKGROUND

1. Related Technical Fields

Related technical fields include traffic situation determination systems, methods, and programs that determine a traffic situation on a road.

2. Related Art

On-vehicle navigation devices, personal digital assistants (PDAs), mobile information devices such as a mobile phone, personal computers, and the like, are capable of displaying a map of a desired area to a user. The maps are displayed by storing information on roads such as a general road and an expressway, facility names, and the like as map information in various storage devices, downloading the map information from a server, and/or the like.

Traffic information such as traffic jam information of a displayed road may also be provided in order to improve the user's convenience. As a new system of acquiring the traffic information, a probe car system, in which a running vehicle acts as a sensor (probe) to gather probe information in a probe center and thereby produce the traffic information, is currently under research. The probe information may include a current position, travel path, speed, and the like, measured by the probe vehicle. For example, Japanese Patent Application Publication No. JP-A-2004-234649 (e.g., page 5 and FIG. 2) discloses a system that accumulates probe information gathered from a probe car, generates traffic information by performing a statistical process on the accumulated information, and provides the traffic information to a terminal such as a navigation device or a PC.

Also, in the related art, a vehicle position can be specified using a mobile phone installed in a vehicle. Specifically, the current position of the mobile phone in a mobile phone communication network can be identified by a known enhanced observed time difference (E-OTD) method, a time difference of arrival (TDOA) method, a cell-ID method, and/or the like. The information center acquires the information via the mobile phone communication network, whereby the position of the phone (an thus the vehicle) can be specified on the information center side without performing communication with the vehicle.

SUMMARY

Generally, when transmitting information relating to the current position of a vehicle and the like to an information center from the vehicle, the transmission is performed via a communication terminal such as a mobile phone or a PHS (Personal Handyphone System) provided in the vehicle. However, to transmit the information, the number of times that communication is required and the amount of communication data can become extremely large, thereby resulting in high communication fees. This is especially the case if the information relating to the current position and the like of the vehicle is constantly transmitted to the information center while the vehicle is running. On the other hand, the reliability of the traffic information generated in the information center decreases if only limited data is transmitted a limited number of times.

Furthermore, the accuracy of the specification of the vehicle position based on a mobile phone communication network is low. As a result, the reliability of traffic information decreases when the traffic information is generated-based only on a vehicle position based on a mobile phone communication network.

Various exemplary implementations of the broad principles disclosed herein provide devices, methods, and programs that can maintain the accuracy of travel path information of the vehicle used for determining traffic jam situations, thereby accurately determining traffic jam situations, decreasing the number of times of communication and the amount of communication data for communication between the vehicle and an information center, and reducing a communication processing load and communication fees.

Exemplary implementations provide systems, methods, and programs that acquire a current position of the vehicle based on a radio signal received from a GPS satellite and determine a first travel path of the vehicle based on the acquired position of the vehicle. The systems, methods, and programs determine whether a road on which the vehicle is traveling has a traffic jam. If the road on which the vehicle is traveling has a traffic jam, the systems, methods and programs transmit first information relating to the first travel path from the vehicle to an information center. The systems, methods, and programs receive second information relating to a second travel path of the vehicle, the second information being received from a mobile phone communication center and being based on a mobile phone signal received by the mobile phone communication center. The systems, methods, and programs determine a road corresponding to the first travel path as having a traffic jam and determine a road corresponding to the second travel path, and not corresponding to the first travel path, as having no traffic jam.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Figure 1:
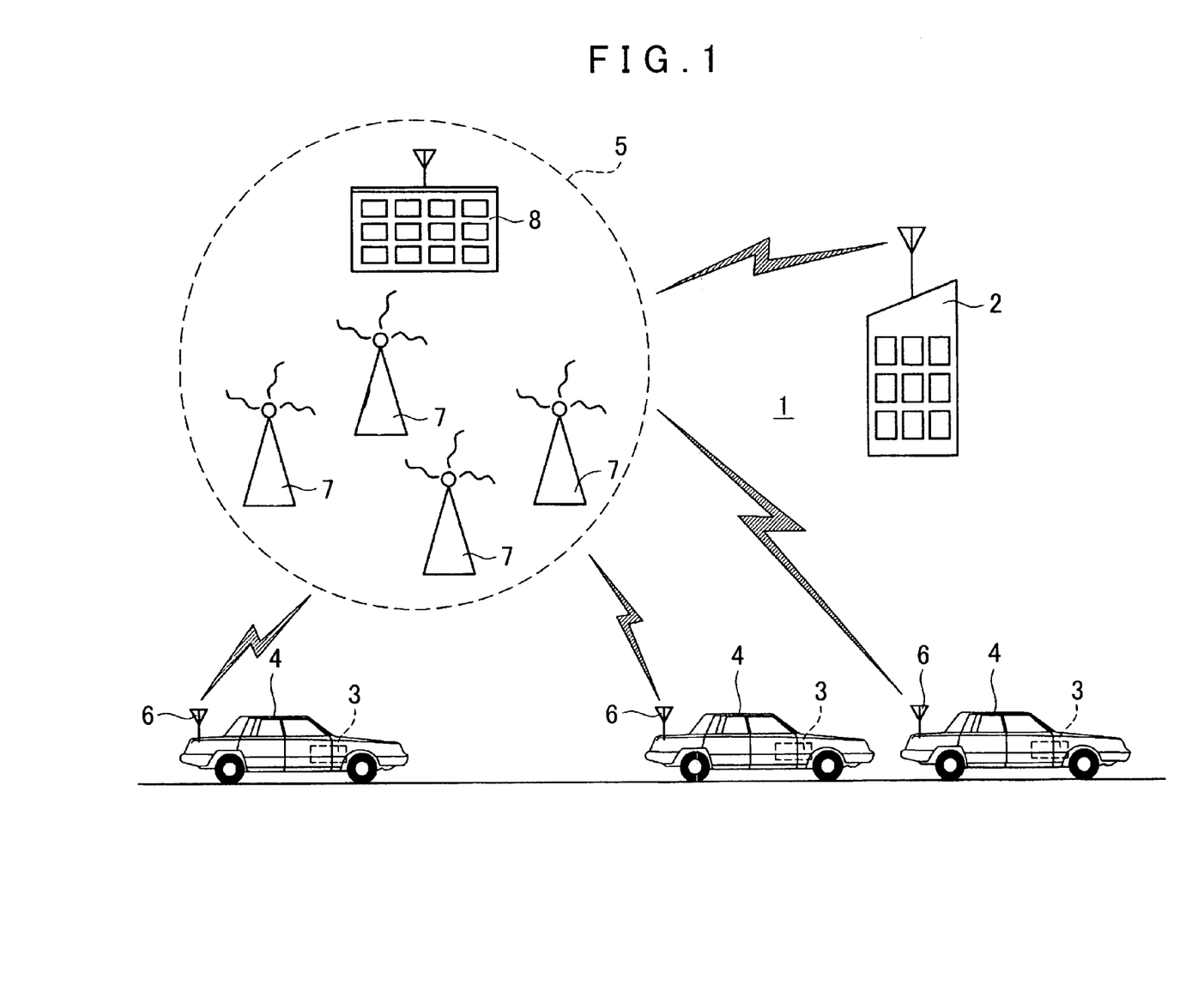
FIG. 1 is a schematic diagram showing an exemplary traffic situation determination system.

First, the schematic configuration of an traffic situation determination system 1 according to the present example will be described using FIG. 1. As shown in FIG. 1, the traffic situation determination system 1 according to this example is formed basically of a probe center 2 that gathers probe information and performs generation/delivery of traffic information based on the gathered probe information, a probe car 4 installed with a navigation device 3, and a mobile phone communication network 5 which links mobile phones to enable interactive communication.

The probe center 2 is a traffic information delivery center that gathers and accumulates the probe information including information relating to the current position of probe cars 4 transmitted from each probe car 4 traveling in various areas of the nation, generates the traffic information such as traffic jam information from the accumulated probe information, and delivers the generated traffic information (hereinafter referred to as "probe traffic information") to vehicles, including the probe cars 4. In the traffic situation determination system 1 according to this example, information relating to the travel path of the probe car 4 specified by the mobile phone communication network 5 is also gathered via the mobile phone communication network 5. The probe center 2 determines the traffic jam situation at each link based on the information relating to the travel path of the probe car 4 gathered from the probe car 4 and via the mobile phone communication network 5, and generates the traffic information based on the determination results.

The probe car 4 is a vehicle traveling on roads in the nation and forms a probe car system together with the probe center 2. The probe car system is a system that gathers information with the probe cars 4 acting as a sensors. Specifically, the probe car system is a system in which each probe car 4 transmits an operational state of various systems such as speed data, steering action, shift position, and/or the like together with position information of the vehicle detected by a global positioning system (GPS) to the probe center 2 via a mobile phone 6 as a communication module installed in the vehicle in advance. Such gathered data is reused as various information on the probe center 2 side.

The probe information acquired by the probe car 4 and transmitted to the probe center 2 in the traffic situation determination system 1 according to this example particularly includes the information relating to the travel path of the traveling probe car 4.

Further, the probe car 4 is provided with the navigation device 3. The navigation device 3 is in-vehicle equipment that displays a map around the position of the vehicle based on stored map data and performs search and guidance of a route to a set destination. The navigation device 3 may performs such guidance based on the probe traffic information received from the probe center 2. Further, as described below, the navigation device 3 performs a process of calculating the degree of traffic jam on roads based on a travel history, and a process of transmitting the probe information relating to the travel path of the vehicle detected by the GPS, in particular if the degree of traffic jam is calculated to be traffic jam or congestion, to the probe center 2. An exemplary configuration of the navigation device 3 is described below.

The mobile phone communication network 5 includes a number of base transceiver stations 7 located in various areas of the nation and a mobile phone center 8 that manages and controls each base transceiver station 7, and is formed of a wired (optical fiber, ISDN, and the like) or wireless connection of the base transceiver stations 7 and the mobile phone center 8 with each other.

The base transceiver station 7 has a transceiver (transmitter/receiver) that communicates with the mobile phone 6 in motion, and an antenna. The base transceiver station 7 acts as a terminal of the mobile phone communication network 5 that serves to relay a call and communication of the mobile phones 6 within a range (cell) in which radio signals from the base transceiver station 7 can be reached, to the mobile phone communication network 5.

The mobile phone communication network 5 identifies the current position of the mobile phone 6 (and thus of the probe car 4) by a known enhanced observed time difference (E-OTD) method, a time difference of arrival (TDOA) method, a cell-ID method, and/or the like. For example, in the cell-ID method, a signal is received from the mobile phone 6, whereby a cell (or a sector when the cell is divided in units of sectors) in which the mobile phone 6 exists is specified to measure the position of the probe car 4. In this case, if the mobile phone communication network 5 limits the target to in-vehicle communication instruments, the position of the mobile phone 6 can be recognized as the position of the probe car 4. Note that the mobile phone communication network 5 can constantly identify the position of the mobile phone 6 (and thus of the probe car 4) without the expense of communication fees.

The mobile phone center 8 is a communication management center that performs communication with the base transceiver stations 7 in each area and transmits the information relating to the travel path of the probe car 4 identified by the mobile phone communication network 5 to the probe center 2. Note that a data communication module (DCM) may be used as the mobile phone 6.

Figure 2:
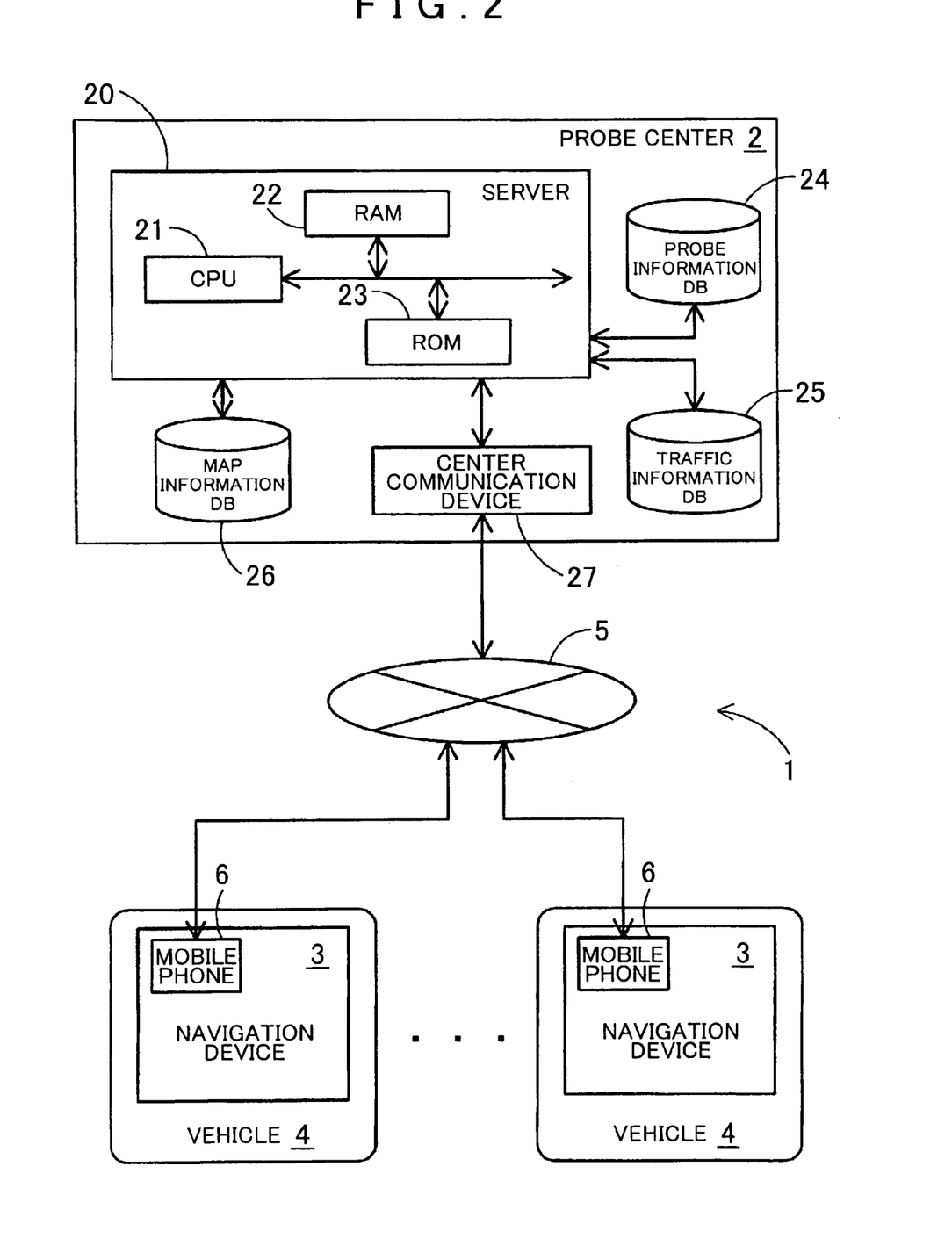
FIG. 2 is a block diagram showing the configuration of an exemplary probe center.

Next, an exemplary configuration of the probe center 2 forming the traffic situation determination system 1 is described in detail using FIG. 2. As shown in FIG. 2, the probe center 2 includes a server 20, a probe information database (DB) 24 connected to the server 20, a traffic information DB 25, a map information DB 26, and a center communication device 27.

The server 20 is a control section which performs various controls in the probe center 2, such as correcting the position information of the probe car 4 acquired via the mobile phone communication network 5 based on the travel path information of the probe car 4 acquired from the probe car 4, determining the traffic jam situation on roads by a statistical process of the probe information gathered from the probe car 4 and via the mobile phone communication network 5, and producing various traffic information including the traffic jam situation on roads and delivering the various traffic information to the probe car 4. The server 20 includes a controller (CPU 21) as an arithmetic device and a control device, and internal storage devices such as a RAM 22 used as a working memory when the CPU 21 performs various arithmetic processes, and a ROM 23 that stores various control programs, a program implementing a traffic situation determination method (see, e.g., FIG. 4) and/or the like.

The probe information DB 24 is a storage unit that cumulatively stores the probe information gathered from probe cars 4 traveling across the nation and the information relating to the travel paths of each of the probe cars 4 gathered via the mobile phone communication network 5. Note that, in this example, the probe information gathered from the probe car 4 particularly includes position coordinates showing a traveling position of the probe car 4. For each probe car 4, a plurality of position coordinates defines a travel path of the probe car 4.

The traffic information DB 25 is a storage unit that stores probe statistical traffic information generated by the server 20 by performing a statistical process on the probe information stored in the probe information DB 24. The probe statistical traffic information includes information such as a proceeding direction of the link, a link travel time, the average vehicle speed, the degree of traffic jam at the link, and/or the like.

The map information DB 26 is a storage unit that stores, for example, link data relating to roads (links), node data relating to node points, map display data for displaying a map, intersection data relating to intersections, search data for searching a route, facility data relating to facilities, and/or retrieval data for retrieving a location. The server 20 performs the map matching process of specifying the position of the probe car 4 on a map based on the travel path information of the vehicle acquired from the probe car 4 and via the mobile phone communication network 5 and map information stored in the map information DB 26.

The center communication device 27 is a communication device for performing communication with the probe car 4 via the mobile phone communication network 5. The probe center 2 in this example acquires information relating to the travel path of the probe car 4 specified in the mobile phone communication network 5 via the center communication device 27.

Figure 3:
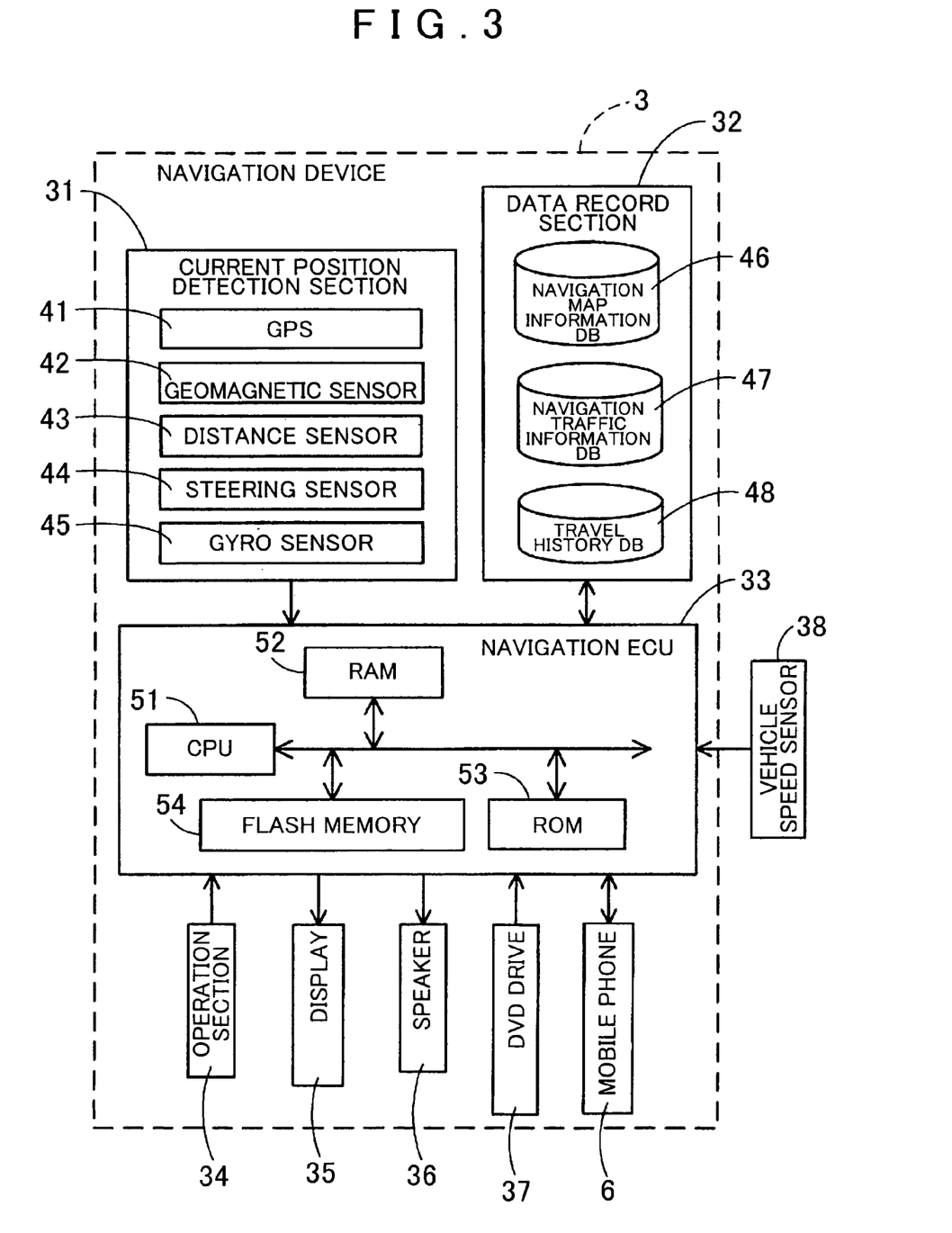
FIG. 3 is a block diagram showing the configuration of an exemplary navigation device.

Next, an exemplary schematic configuration of the navigation device 3 installed in the probe car 4 will be described using FIG. 3. As shown in FIG. 3, the navigation device 3 according to this example is formed of a current position detection section 31 that detects the current position of the vehicle, a memory (data record section 32) that stores various data, a navigation ECU 33 that performs various arithmetic processes based on input information, an operation section 34 that accepts an operation from an operator, a display 35 that displays information such as a map to the operator, a speaker 36 that outputs voice guidance relating to route guidance, a DVD drive 37 that reads a DVD as a storage medium storing a program, and the mobile phone 6 that performs communication with the probe center 2. The navigation ECU 33 is connected with a vehicle speed sensor 38 that detects the traveling speed of the vehicle.

The current position detection section 31 is formed of, for example, a GPS 41, a geomagnetic sensor 42, a distance sensor 43, a steering sensor 44, a gyro sensor 45 as a direction detection section, and/or an altimeter (not shown), and is capable of detecting the current position of the vehicle, a direction, a distance to an object (for example, an intersection), and/or the like. The GPS 41 is a receiver that receives GPS signals from a GPS satellite, and the navigation ECU 33 acquires a GPS measurement point that specifies the current position of the vehicle based on the GPS signals received by the GPS 41.

The data record section 32 includes a hard disk (not shown) as an external storage device and a storage medium, and a recording head (not shown) as a driver for reading a navigation map information DB 46, a navigation traffic information DB 47, a-travel history DB 48, a predetermined program, and/or the like recorded in a hard disk, and for writing predetermined data on the hard disk.

The navigation map information DB 46 basically has the same configuration as that of the map information DB 26 of the probe center 2, and is a storage unit that stores, for example, link data relating to roads (links), node data relating to node points, map display data for displaying a map, intersection data relating to intersections, search data for searching a route, facility data relating to facilities, and/or retrieval data for retrieving a location.

The navigation traffic information DB 47 is a storage unit that stores the probe statistical traffic information delivered from the probe center 2 and Vehicle Information and Communication System (VICS®) information delivered from a VICS center. The navigation ECU 33 performs route search and traffic information guidance using the traffic information stored in the navigation traffic information DB 47.

The travel history DB 48 is a storage unit that accumulatively stores, for example, results detected by various censors while the probe car 4 is traveling (e.g., the current position, speed, steering angle, and/or brake application force of the vehicle). The navigation ECU 33 calculates the degree of traffic jam on a road on which the vehicle travels based on the travel history stored in the travel history DB 48.

The navigation electronic control unit (ECU) 33 is an electronic control unit that performs an overall control of the navigation device 3 such as setting a guidance route to the destination from the current position in the case where the destination is selected, calculating the degree of traffic jam on a road on which the vehicle is traveling based on the travel history, and transmitting, as the probe information, the current position of the vehicle acquired by the current position detection section 31 to the probe center 2 in the case where the degree is calculated as traffic jam or congestion. The navigation ECU 33 includes a controller (CPU 51) as an arithmetic device and a control device, internal storage devices such as a RAM 52 that is used as a working memory when the CPU 51 performs various arithmetic processes and stores route data and the like of a searched route, a ROM 53 in which a control program, a program that implements a traffic situation determination method (see, e.g., FIG. 4) and/or the like are recorded, and a flash memory 54 in which a program read from the ROM 53 is recorded.

Figure 4:
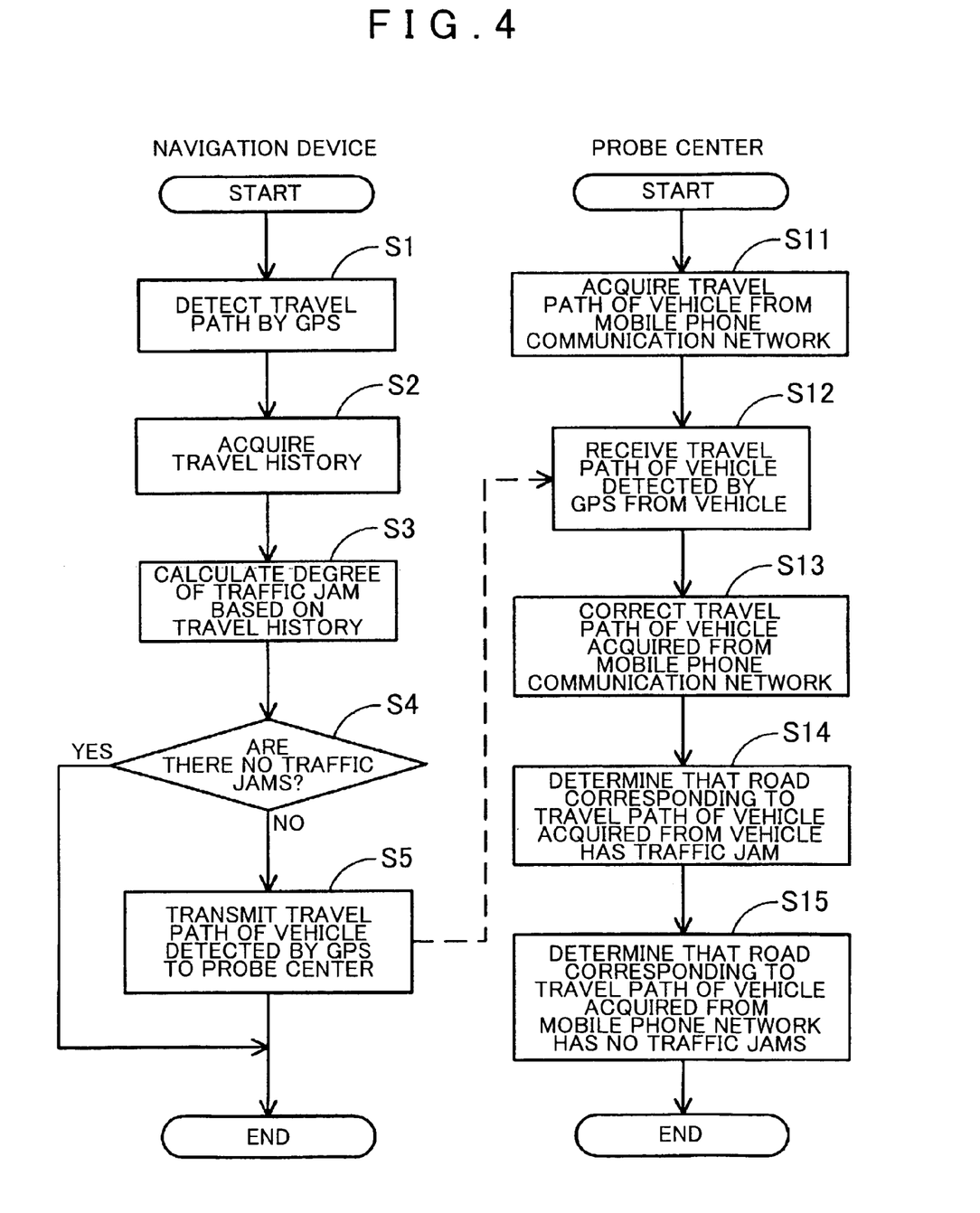
FIG. 4 is a flowchart showing an exemplary traffic situation determination method.

Next, an exemplary traffic situation determination method will be described with reference to FIG. 4. The exemplary method may be implemented, for example, by one or more components of the above-described system 1. For example, the method may be implemented by a program that executed at predetermined intervals and is stored in the RAM, ROM, or the like included in the navigation ECU 33 or the server 20, and is executed by the CPU 51 or the CPU 21. However, even though the exemplary structure of the above-described system 1 may be referenced in the description, it should be appreciated that the structure is exemplary and the exemplary method need not be limited by any of the above-described exemplary structure.

In step (hereinafter abbreviated as "S") 1, the GPS 41 receives GPS signals from the GPS satellite, whereby the CPU 51 detects the travel path of the probe car 4. The current time is also detected. In this example, the acquired travel path of the probe car 4 in this case is a GPS measurement point (latitude and longitude).

Subsequently, in S2, the CPU 51 reads out the travel history of the probe car 4 from the travel history DB 48. The read out travel history may be a travel history from a predetermined time (e.g., one minute) in the past until the present time, or may be a travel history related to the link on which the probe car 4 is traveling.

Next, in S3, the CPU 51 calculates the degree of traffic jam on the road (link) on which the probe car 4 is traveling based on the traveling history acquired in S2. The degree of traffic jam is a type of traffic jam information representing the level of traffic jam, and may include, for example, three degrees of "traffic jam," "congestion," and "no traffic jam" in descending order of severity. In this example, the degree of traffic jam is determined based on thresholds set depending on the speed of the probe car 4 and the type of the road (for example, the threshold for a general road is 12 km/h between "traffic jam" and "congestion," and 32 km/h between "congestion" and "no traffic jam").

Next, in S4, the CPU 51 determines whether the calculated degree of traffic jam on the road on which the probe car 4 is traveling is "no traffic jam." If the degree of traffic jam on the road on which the vehicle is traveling is determined to be "no traffic jam" (YES in S4), the method terminates without transmitting any information relating to the travel path of the vehicle detected by the GPS 41 to the probe center 2.

If the degree of a traffic jam on the road on which the vehicle is traveling is determined to be "traffic jam" or "congestion" (NO in S4), the method proceeds to S5. In S5, the information relating to the travel path of the vehicle detected by the GPS 41 (e.g., the travel path of the vehicle traveling on the road determined to have the degree of "traffic jam" or "congestion") and the detection time of the travel path are transmitted as probe information to the probe center 2 through the mobile phone 6. The information relating to the travel path of the vehicle transmitted to the probe center 2 may be not only the position coordinates (x, y) specifying the position of the vehicle but also a link number of a link in which the vehicle is located, specified by performing a map matching, or position coordinates corrected by the map matching process. Further, the speed of the vehicle or the traveling direction, for example, may also be transmitted with the position.

With respect to the probe center 2, in S11, the CPU 21 acquires the travel path information, specified in the mobile phone communication network 5, of probe cars 4 traveling across the nation from the mobile phone center 8 via the center communication device 27. The time corresponding to the travel path of each of the probe cars 4 (i.e., time at which the vehicle has traveled on the path) is also acquired. Note that the travel path information of the probe car 4 to be acquired may be travel path information in real time or travel path information of a predetermined period in the past. Examples of a method for specifying the travel path of the vehicle via the mobile phone communication network 5 may include the E-OTD, the TDOA, the cell-ID methods, and/or the like.

Subsequently, in S12, the CPU 21 receives the information relating to the travel path of the probe car 4 based on the GPS 41 and transmitted from the probe car 4 in S5. Then, in S13, the CPU 21 corrects the travel path information of the probe car 4 acquired via the mobile phone communication network 5 based on the GPS travel path information of the probe car 4 received from the probe car 4.

Figure 5:
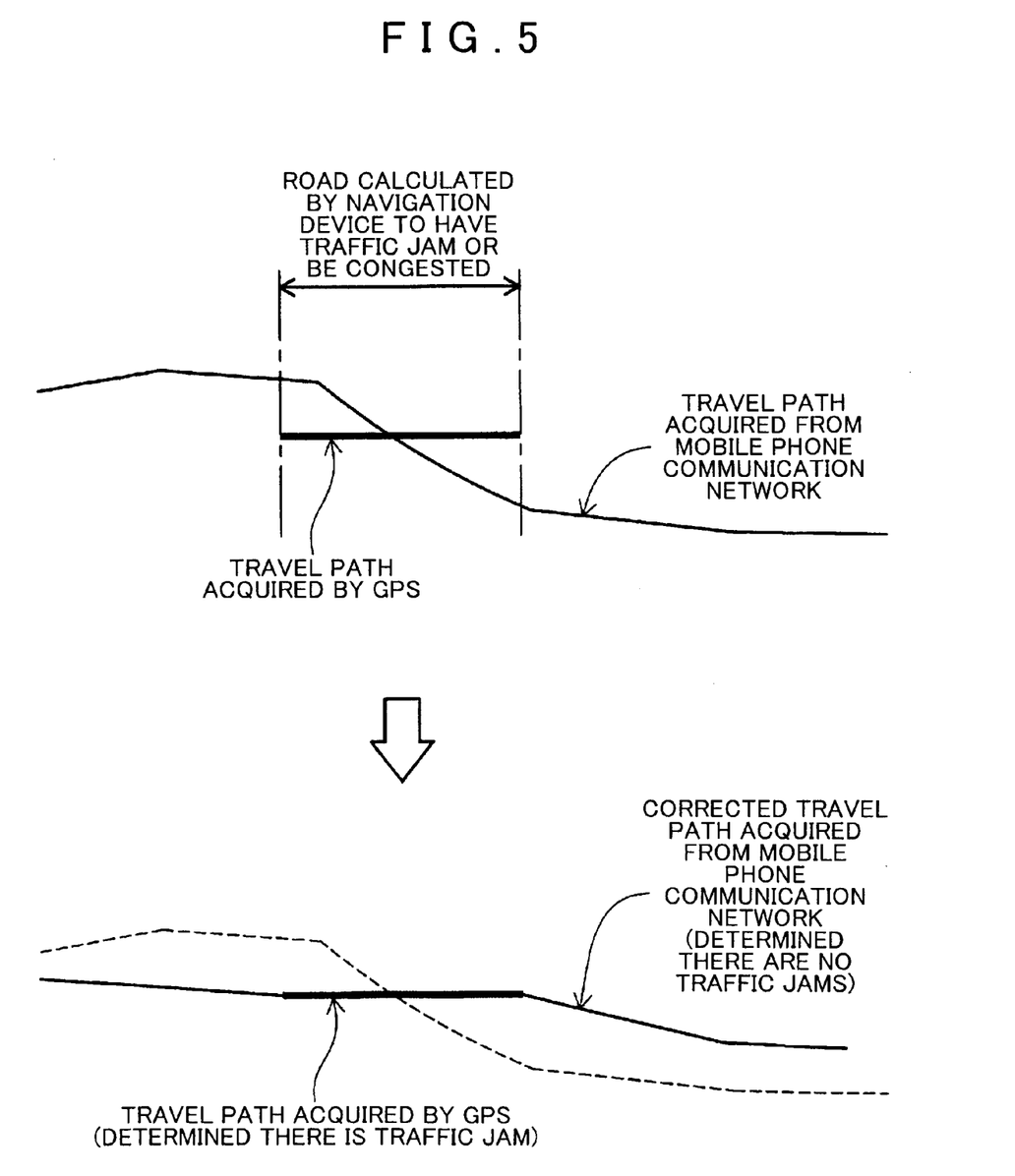
FIG. 5 is a diagram illustrating an exemplary position information correction process.

An example of such a correction process of travel paths is described with reference to FIG. 5. As shown in FIG. 5, the probe center 2 acquires two types of travel paths: (1) travel paths of the probe car 4 acquired via the mobile phone communication network 5, and (2) travel paths of the probe car 4 based on the GPS 41 transmitted from the probe car 4. Because the position of the probe car 4 specified in the mobile phone communication network 5 is less accurate than the position of the probe car 4 specified by the GPS 41, there is usually a difference between the two types of travel paths for a same location. The travel path information of the probe car 4 based on the GPS 41 is transmitted from the probe car 4 with respect to the roads determined to have the degree of "traffic jam" or "congestion" by the navigation device 3. The probe center 2 therefore acquires the travel path information of the probe car 4 based on the GPS 41 with respect to only a part of the entire travel path of each probe car 4 having traffic congestion.

Because the position of the probe car 4 specified by the GPS 41 is more accurate than the position of the probe car 4 specified in the mobile phone communication network 5, more accurate travel path information of the vehicle can be obtained by correcting the travel path information of the probe car 4 acquired via the mobile phone communication network 5 based on the travel path information of the probe car 4 based on the GPS 41, which is only available for limited regions. Therefore, in the process of S13, the travel path information of the probe car 4 acquired via the mobile phone communication network 5 is corrected such that the travel path of the probe car 4 based on the GPS 41 becomes continuous with the travel path of the vehicle based on the mobile phone communication network 5, as shown in FIG. 5.

Returning to FIG. 4, in S14, the CPU 21 performs a map matching process on the travel path information of the probe car 4 that is based on the GPS 41 and is transmitted from the probe car 4 in S12, specifies a road corresponding to the travel path information, and determines that the specified road has traffic congestion.

Subsequently, in S15, the CPU 21 performs a map matching process on the travel path information of the probe car 4 acquired via the mobile phone communication network 5 in S11 and corrected in S13, specifies roads corresponding to the travel path information, and then determines that roads except for the roads specified in S14 to have no traffic congestion.

The travel path information of the probe car 4 that is based on the GPS 41 and is transmitted form the probe car 4, the travel path information of the probe car 4 acquired via the mobile phone communication network 5 and corrected in S13, and the traffic jam situation determined in S14 and S15 are stored in the probe information DB 24 as the probe information. A statistical process on the stored probe information is carried out at predetermined intervals (for example, 5 minutes, 24 hours, and 1 year), thereby generating the traffic information such as the degree of traffic jam. For example, based on the travel paths of the probe car 4 in S14 and S15, the degree of traffic jam is calculated to be traffic jam in a time period when the degree for the road is determined to be traffic jam at 80% or higher, calculated to be congestion in a time period when the degree for the road is determined to be traffic jam at 50% or higher, and is calculated to be no traffic jams for other occasions.

Note that the generated traffic information is delivered to vehicles, including the probe cars 4, whereby the navigation device 3 installed in the vehicles can perform guidance of the delivered traffic information and set a guidance route depending on the degree of traffic jam.

In the traffic situation determination system 1 according to the present example, the probe car 4 transmits, when traveling on a road calculated to have the degree of "traffic jam" or "congestion" (NO in S4), information relating to the travel path of the probe car 4 detected by the current position detection section 31 to the probe center 2 (S5). The probe center 2 acquires the travel path information of the probe car 4 via the mobile phone communication network 5 through the mobile phone 6 (S11), determines roads corresponding to the travel path of the probe car 4 specified by the GPS 41 to be in the situation of traffic jam (S14), and determines roads corresponding to the travel path of the probe car 4 specified in the mobile phone communication network 5 to be in the situation of no traffic jams (S15). Therefore, the probe center 2 maintains the accuracy of travel path information of the vehicle used for determining traffic jam situations, thereby determining the traffic jam situation, which is important information for the vehicle, more accurately. In addition, the number of times of communication and the amount of communication data for communication between the probe car 4 and the probe center 2 can be decreased, thereby reducing a communication processing load and communication fees.

Furthermore, correction of the travel path of the probe car 4 specified in the mobile phone communication network 5 (which is less accurate than the travel path specified by the GPS 41) based on the travel path of the probe car 4 specified by the GPS 41 enables more accurate determination of traffic situations, while the number of times of communication and the amount of communication data for communication between the probe car 4 and the probe center 2 is decreased.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, while the navigation device 3 calculates the degree of traffic jam on the road on which the vehicle is traveling in S3 in the present example, the navigation device 3 may calculate the degree of traffic jam on roads on which the vehicle ran in the past. In this case, the travel path information of the vehicle in the past when the vehicle has traveled roads calculated to have the degree of traffic jam or congestion in S5 is transmitted to the probe center 2.

While the travel path information transmitted from the probe car 4 to the probe center 2 is travel path information of the vehicle traveling on a road calculated to have the degree of "traffic jam" or "congestion" by the navigation device 3 in the present example, the transmitted information may be limited to the travel path information of the vehicle traveling on a road calculated to have the degree of "traffic jam."

While, in the present example, the probe center 2 determines a road corresponding to the travel path of the probe car 4 specified by the GPS 41 to be in the situation of traffic jam (S14) and thereafter determines a road corresponding to travel paths except for the travel path of the probe car 4 specified by the GPS 41 to be in the situation of no traffic jams (S15), the order of S14 and S15 may be reversed. Specifically, roads corresponding to the entire travel paths of the probe car 4 specified in the mobile phone communication network 5 are first determined to have no traffic jams, and the situation may be updated to traffic jam with respect to roads corresponding to the travel path of the probe car 4 specified by the GPS 41 thereafter.

Figure 6:
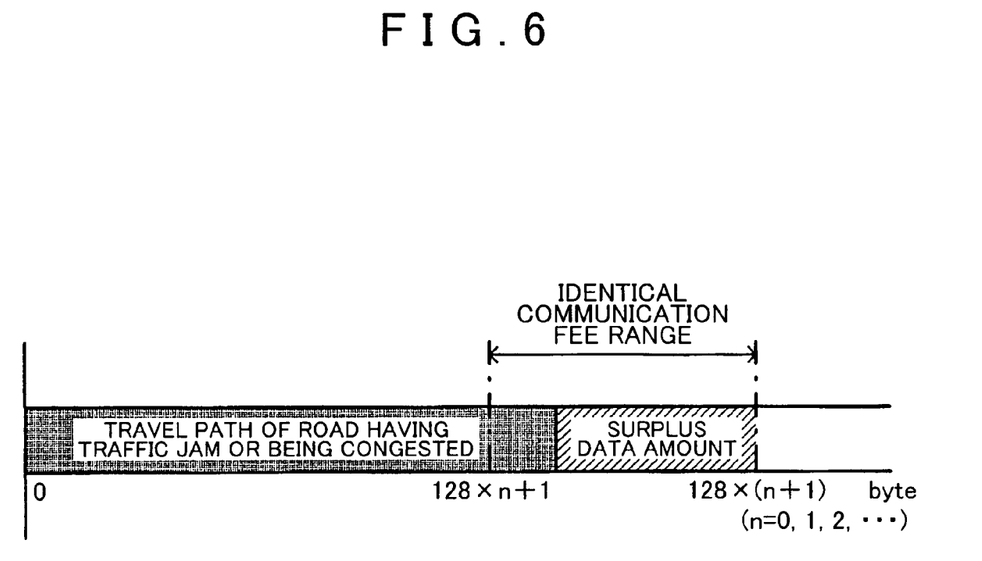
FIG. 6 is a schematic view showing an amount of communication data for transmitting travel path information from a probe car to the probe center.

While the travel path information transmitted from the probe car 4 to the probe center 2 is travel path information of the vehicle traveling on a road calculated to have the degree of "traffic jam" or "congestion" by the navigation device 3 in the present example, travel path information of the vehicle traveling not only on a road calculated to have the degree of "traffic jam" or "congestion" but also on a road adjacent to the road may be transmitted to the probe center 2. For example, as shown in FIG. 6, the range of the amount of communication data (e.g., from (128×n)+1 bytes to 128×(n+1) bytes, where n=0, 1, 2, . . . ) that can be communicated through the mobile phone 6 in an identical communication fee range is fixed in advance. Accordingly, in converting the amount of data of travel paths of the vehicle that has traveled on a road calculated to have the degree of traffic jam or congestion into the amount of communication data that can be communicated in an identical communication fee range, a surplus data amount that can be communicated in the identical communication fee range may be available. In this case, transmitting travel path information of the vehicle traveling on roads adjacent to the road calculated to have the degree of "traffic jam" or "congestion" by making use of the surplus data amount, it is possible to enhance the accuracy of the travel paths of the vehicle on the information center side without increasing communication fees.

Furthermore, the travel path information of the vehicle traveling on a road calculated to have the degree of "traffic jam" or "congestion" and the travel path information of the vehicle on roads adjacent to the road within a predetermined distance range (e.g., within 100 m) may be transmitted to the probe center 2 regardless of the amount of communication data.

What is claimed is:

1. A traffic situation determination system, comprising:
   a vehicle;
   a mobile phone communication network that estimates a travel path of the vehicle based on a mobile phone location signal received from the vehicle; and
   an information center that communicates with a communication device of the vehicle and the mobile phone communication network; and
   the vehicle including:
      the communication device that communicates over the mobile phone communication network via a mobile phone communication signal; and
      a controller that:
         acquires a current position of the vehicle based on a radio signal received from a GPS satellite;
         determines the travel path of the vehicle based on the acquired position of the vehicle;
         determines whether a road on which the vehicle is traveling has a traffic jam;
         if the road on which the vehicle is traveling has a traffic jam, causes the communication device to transmit information relating to the travel path to the information center; and
         if the road on which the vehicle is traveling does not have a traffic jam, does not cause the communication device to transmit information relating to the travel path to the information center;
   wherein the mobile phone location signal is a signal received by the mobile phone communication network to determine the location of the communication device and is different from the mobile phone communication signal, which is used to communicate data over the mobile phone communication network.

2. The traffic situation determination system of claim 1, wherein the controller:
   acquires a speed of the vehicle;
   compares the acquired speed to a predetermined threshold speed; and
   if the acquired speed is less or equal to than the predetermined threshold speed, determines that the road on which the vehicle is traveling has a traffic jam.

3. The traffic situation determination system of claim 1, wherein the transmitted information relating to the travel path is information relating to the road on which the vehicle is traveling.

4. The traffic situation determination system of claim 1, wherein the transmitted information relating to the travel path is:
   information relating to the road on which the vehicle is traveling; and
   information relating to a road adjacent to the road on which the vehicle is traveling.

5. The traffic situation determination system of claim 1, wherein the transmitted information relating to the travel path is:
   information relating to the road on which the vehicle is traveling; and
   an amount of information about a road or roads adjacent to the road on which the vehicle is traveling whose transmission would not raise a communication cost compared to a communication cost of transmitting only the information relating to the road on which the vehicle is traveling.

6. The traffic situation determination system of claim 1, wherein the controller is included in a navigation device installed in the vehicle.

7. An information center, comprising:
   a communication device that communicates with a mobile phone communication center and a vehicle; and
   a controller that:
      acquires from the communication device first information relating to a first travel path of the vehicle, the first information being received from the vehicle over a mobile phone communication network via a mobile phone communication signal and being based on a radio signal received from a GPS satellite;
      acquires from the communication device second information relating to a second travel path of the vehicle, the second information being received from the mobile phone communication center and having been estimated based on a mobile phone location signal received by the mobile phone communication center;
      determines a road corresponding to the first travel path as having a traffic jam; and
      determines a road corresponding to the second travel path, and not corresponding to the first travel path, as having no traffic jam;
   wherein the mobile phone location signal is a signal received by the mobile phone communication center to determine the location of the vehicle and is different from the mobile phone communication signal, which is used to communicate data over the mobile phone communication network.

8. The information center of claim 7, wherein the controller:
   corrects the second travel path based on the first information.

9. The information center of claim 8, wherein the first information is information relating to a road on which the vehicle is traveling.

10. The information center of claim 8, wherein the first information is:
    information relating to a road on which the vehicle is traveling; and
    information relating to a road adjacent to the road on which the vehicle is traveling.

11. The information center of claim 8, wherein the first information is:
    information relating to a road on which the vehicle is traveling; and
    an amount of information about a road or roads adjacent to the road on which the vehicle is traveling whose transmission would not raise a communication cost compared to a communication cost of transmitting only the information relating to the road on which the vehicle is traveling.

12. A traffic situation determining method, comprising:
    acquiring, with a vehicle controller, a current position of a vehicle based on a radio signal received from a GPS satellite;
    determining, with the vehicle controller, a first travel path of the vehicle based on the acquired position of the vehicle;
    determining, with the vehicle controller, whether a road on which the vehicle is traveling has a traffic jam;
    if the road on which the vehicle is traveling has a traffic jam, causing a communication device to transmit first information relating to the first travel path from the vehicle to an information center via a mobile phone communication signal communicated over a mobile phone communication network, the information center having an information center controller;
    receiving, with the information center controller, second information relating to a second travel path of the vehicle, the second information being received from a mobile phone communication center and having been estimated based on a mobile phone location signal received by the mobile phone communication center;
    determining, with the information center controller, a road corresponding to the first travel path as having a traffic jam; and
    determining, with the information center controller, a road corresponding to the second travel path, and not corresponding to the first travel path, as having no traffic jam;
    wherein the mobile phone location signal is a signal received by the mobile phone communication center to determine the location of the vehicle and is different from the mobile phone communication signal, which is used to communicate data over the mobile phone communication network.

13. The traffic situation determining method of claim 12, further comprising:
    correcting the second travel path based on the first information.

14. The traffic situation determining method of claim 13, wherein the first information is information relating to the road on which the vehicle is traveling.

15. The traffic situation determining method of claim 13, wherein the first information is:
    information relating to the road on which the vehicle is traveling; and
    information relating to a road adjacent to the road on which the vehicle is traveling.

16. The traffic situation determining method of claim 13, wherein the first information is:
    information relating to the road on which the vehicle is traveling; and
    an amount of information about a road or roads adjacent to the road on which the vehicle is traveling whose transmission would not raise a communication cost compared to a communication cost of transmitting only the information relating to the road on which the vehicle is traveling.

17. A non-transitory computer-readable storage medium storing a computer-executable program usable to determine a traffic situation, the program comprising:

instructions for acquiring a current position of a vehicle based on a radio signal received from a GPS satellite;

instructions for determining a first travel path of the vehicle based on the acquired position of the vehicle;

instructions for determining whether a road on which the vehicle is traveling has a traffic jam;

instructions for, if the road on which the vehicle is traveling has a traffic jam, transmitting first information relating to the first travel path from the vehicle to an information center via a mobile phone communication signal communicated over a mobile phone communication network;

instructions for receiving second information relating to a second travel path of the vehicle, the second information being received from a mobile phone communication center and having been estimated based on a mobile phone location signal received by the mobile phone communication center;

instructions for determining a road corresponding to the first travel path as having a traffic jam; and instructions for determining a road corresponding to the second travel path, and not corresponding to the first travel path, as having no traffic jam;

wherein the mobile phone location signal is a signal received by the mobile phone communication center to determine the location of the vehicle and is different from the mobile phone communication signal, which is used to communicate data over the mobile phone communication network.

* * * * *